E. R. PROCTER.

NUT LOCK.

No. 10,704. Reissued Mar. 30, 1886.

Inventor:
Edwin R. Procter
By Knight Bros.
Attys.

Attest:
A. P. Knight
Geo. L. Wheelock

N. PETERS, Photo-Lithographer, Washington, D.C.

UNITED STATES PATENT OFFICE.

EDWIN R. PROCTER, OF WASHINGTON COURT-HOUSE, OHIO.

NUT-LOCK.

SPECIFICATION forming part of Reissued Letters Patent No. 10,704, dated March 30, 1886.

Original No. 328,972, dated October 27, 1885. Application for reissue filed February 8, 1886. Serial No. 191,248.

*To all whom it may concern:*

Be it known that I, EDWIN R. PROCTER, of Washington Court-House, Fayette county, Ohio, have invented a new and useful Improvement in Nut-Locks, of which the following is a specification.

My invention is an improvement in devices for preventing both accidental and clandestine loosening or removal of screw-nuts from their bolts, and is more especially designed for use upon bolts which unite fish-plates to railway-rails.

Figure 1:
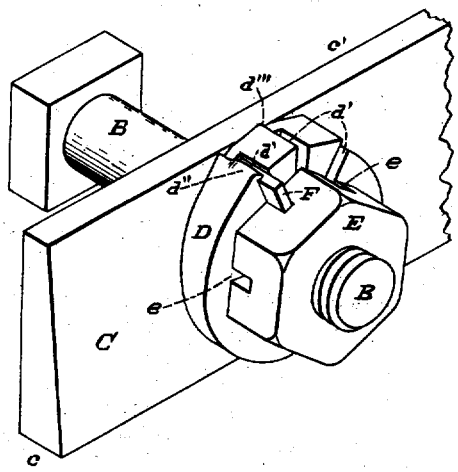
Figure 5:
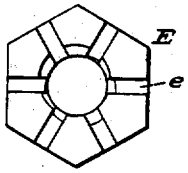
Figure 2:
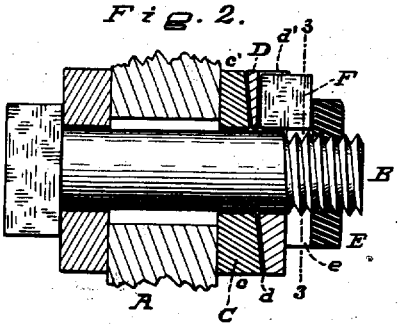
Figure 3:
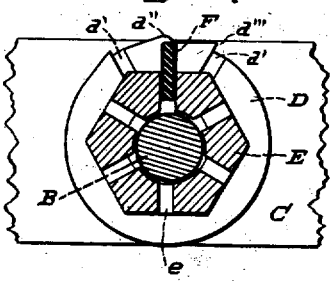
Figure 4:
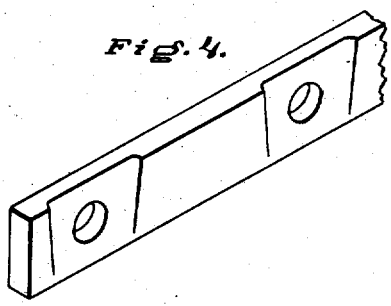

In the accompanying drawings, Figure 1 is a perspective view illustrating my invention. Fig. 2 is a section in the plane of the bolt. Fig. 3 is a section on the line 3 3. Fig. 4 shows a modification of my fish-plate. Fig. 5 is a bottom view of my nut.

A may represent a portion of a railway-rail which it is desired to fasten. B may represent a customary screw-bolt.

C represents part of a fish plate having the represented trapezoidal transverse section, so as to make it thicker at one edge, *c*, than at the other edge, *c'*, and by so doing to present a slanting bearing-surface for the washer D, whose sole *d* or portion which rests upon the fish-plate is correspondingly slanted. The crown of the washer and the sole of the nut E have like radial notches *d' e*, whose angular distance in one member is slightly different to that in the other member, in order that not more than two notches—one in each member—shall in any given position of the nut be precisely opposite each other, but so that a slight turn of the nut forward or backward shall bring another couple of notches into coincidence.

F represents a key or cotter, which, being thrust or driven into the hole formed by the coincidence of two such notches, prevents rotation of the nut with regard to the washer, while the latter is prevented from turning upon the fish-plate by its oblique bearing against the same.

To prevent both accidental and mischievous dislodgment of the key, one or both of the salient angles of the washer-notch are, after insertion of the key, beaten down so as to form a projecting lip, *d''*.

To facilitate such treatment, one of the angles of each washer-notch is preferably so formed as to project farther outward, as at *d'''*.

A modification of my fish-bar is seen in Fig. 4, whose chamfered portions are mainly restricted to those parts of the plate touched by the washer. Fish-plates already constructed of the common rectangular pattern may easily be altered to the shape shown in Fig. 4, by a blacksmith.

I claim as new and of my invention—

In a nut-lock, the combination, with a laterally-chamfered fish-plate, C, of a correspondingly-chamfered washer, D, having in its crown a series of radial notches, *d'*, a screw-nut, E, having in its sole a series of like notches, *e*, of slightly-different angular separation to the said washer-notches, and a key or cotter, F, adapted to be driven into the hole formed by the coincidence of any two of such notches *d'* and *e*, and to be locked therein by the upsetting of one or both the salient angles of such notch *d'*, as and for the purposes set forth.

EDWIN R. PROCTER.

Witnesses:

D. L. TANZEY,

W. J. BLOOMER.